(12) United States Patent
Sikorski et al.

(10) Patent No.: US 10,954,885 B2
(45) Date of Patent: Mar. 23, 2021

(54) FLOW GUIDING DEVICE AND METHOD FOR FORMING A FLOW GUIDING DEVICE

(71) Applicant: Rolls-Royce Deutschland Ltd & Co KG, Blankenfelde-Mahlow (DE)

(72) Inventors: Igor Sikorski, Berlin (DE); Jason Phillips, Blankenfelde-Mahlow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 413 days.

(21) Appl. No.: 15/970,034

(22) Filed: May 3, 2018

(65) Prior Publication Data
US 2018/0320631 A1 Nov. 8, 2018

(30) Foreign Application Priority Data
May 5, 2017 (DE) ...................... 10 2017 207 640.2

(51) Int. Cl.
*F02C 7/28* (2006.01)
*F02F 7/00* (2006.01)
(Continued)

(52) U.S. Cl.
CPC ............ *F02F 7/0082* (2013.01); *F01D 5/084* (2013.01); *F01D 25/12* (2013.01); *F01D 25/243* (2013.01);
(Continued)

(58) Field of Classification Search
None
See application file for complete search history.

(56) References Cited

U.S. PATENT DOCUMENTS

| 4,190,397 A | 2/1980 | Gutknecht et al. |
| 5,090,865 A * | 2/1992 | Ramachandran ....... F01D 5/066 |
| | | 415/112 |

(Continued)

FOREIGN PATENT DOCUMENTS

| DE | 19624048 A1 | 12/1997 |
| DE | 102013220455 A1 | 4/2015 |

(Continued)

OTHER PUBLICATIONS

European Search Report dated Oct. 22, 2018 for counterpart European Patent Application No. 18166813.8.
(Continued)

*Primary Examiner* — Kayla Mccaffrey
(74) *Attorney, Agent, or Firm* — Shuttleworth & Ingersoll, PLC; Timothy Klima (57) ABSTRACT

A flow guiding appliance of a turbomachine, in particular of an aircraft engine, for a partial exit flow of an outlet guide vane of a compressor, wherein, a flow guiding element delimits an annular channel about a shaft of the turbomachine. A frictional engagement connecting surface at the circumference of the flow guiding element connects the flow guiding element to another structural component of the turbomachine. The frictional engagement connecting surface with a closed enveloping surface can be inserted in a deformed state into the structural component with a circular cylindrical sealing surface with at least two opposite points. The at least two points of the closed enveloping surface are arranged in at least two opposite frictionally engaged contact areas of the circular cylindrical sealing surface following deformation. The invention also relates to a method for creating a flow guiding element.

16 Claims, 5 Drawing Sheets

(51) Int. Cl.
*F01D 25/12* (2006.01)
*F02C 7/18* (2006.01)
*F01D 5/08* (2006.01)
*F01D 25/24* (2006.01)
*F02C 3/00* (2006.01)

(52) U.S. Cl.
CPC .............. *F02C 7/18* (2013.01); *F02F 7/0085* (2013.01); *F02F 7/0095* (2013.01); *F02C 3/00* (2013.01)

(56) References Cited

U.S. PATENT DOCUMENTS

| | | | | |
|---|---|---|---|---|
| 5,333,993 | A * | 8/1994 | Stueber | F01D 11/025 415/174.5 |
| 5,822,837 | A | 10/1998 | Schwellenbach et al. | |
| 7,296,415 | B2 * | 11/2007 | Coulon | F01D 11/025 415/170.1 |
| 7,465,148 | B2 * | 12/2008 | Klinger | F01D 5/08 415/107 |
| 7,819,622 | B2 * | 10/2010 | Paulino | F01D 11/005 415/104 |
| 9,447,695 | B2 * | 9/2016 | Baumann | F01D 11/003 |
| 2006/0104809 | A1 | 5/2006 | Fish et al. | |
| 2008/0236164 | A1 | 10/2008 | Bunel et al. | |
| 2010/0316484 | A1 | 12/2010 | Jasko et al. | |

FOREIGN PATENT DOCUMENTS

| | | |
|---|---|---|
| EP | 1978305 A1 | 10/2008 |
| EP | 2226475 A2 | 9/2010 |
| EP | 3153658 A1 | 4/2017 |
| GB | 801944 A | 9/1958 |

OTHER PUBLICATIONS

German Search Report dated Mar. 2, 2018 for counterpart German Patent Application No. DE 10 2017 207 640.2.

* cited by examiner

FLOW GUIDING DEVICE AND METHOD FOR FORMING A FLOW GUIDING DEVICE

This application claims priority to German Patent Application DE102017207640.2 filed May 5, 2017, the entirety of which is incorporated by reference herein.

DESCRIPTION

The invention relates to a flow guiding appliance and a method for creating a flow guiding appliance with features as disclosed herein.

Flow guiding appliances with flow guiding elements for guiding a partial flow inside a turbomachine of the type as regarded herein are known for example from DE 10 2013 220 455 A1, U.S. Pat. Nos. 5,090,865 A, 4,190,397 A or 2010/0316484 A1. Here, it has to be possible to effectively connect the flow guiding elements to other structural components of the turbomachine.

The objective is achieved through a flow guiding appliance with features as disclosed herein.

A connection of the flow guiding element with another structural component of the turbomachine can be created by means of a frictional engagement connecting surface at the circumference of the flow guiding element. Here, the flow guiding element has a frictional engagement connecting surface at the circumference that serves for connecting the flow guiding element to another structural component of the turbomachine. Here, the frictional engagement connecting surface of the flow guiding element has a closed enveloping surface (with a non-circular cross section) with at least two opposite points, wherein the flow guiding element can be inserted in a deformed state into the structural component with a circulars guide vane cylindrical sealing surface, wherein, in the assembled state, the at least two points of the closed enveloping surface are arranged inside at least two opposite frictionally engaged contact areas of the circular cylindrical sealing surface after deformation.

Thus, a firm seating in the structural component during operation can be achieved based on the shape of the flow guiding element in the circumferential area alone. Hence, no special form-fitting means are necessary, which facilitates the establishment of a connection.

In one embodiment, the closed enveloping surface has an elliptical cross section, a regular polygonal cross section, or an oval cross section. These enveloping surfaces can be deformed in such a manner that they can be readily inserted into the circular cylindrical sealing surface of the structural component. A flow guiding element with a regular polygonal cross section is formed to be symmetrical with respect to the central point, so that the corner points of the polygon are located in opposite contact areas after deformation, i.e. after having been fitted into the circular cylindrical sealing surface. A flow guiding element with an elliptical cross section has two symmetry axes, so that after deformation e.g. points at the ends of the major axis of the ellipse are arranged opposite each other in the circular cylindrical sealing surface. Analogously, the flow guiding element with an oval cross section has a symmetry axis, so that points at the ends of the symmetry axis are likewise positioned opposite each other after deformation.

In the case of an elliptical cross section of the closed enveloping surface, one embodiment has an eccentricity of between 0.95 and 0.999, in particular of between 0.99 and 0.996. By adjusting the eccentricity, it is for example possible to define the fitting of the flow guiding element into the circular cylindrical sealing surface.

In one embodiment, the frictional engagement connecting surface has a diameter tolerance of +/−0.3 mm. In a further embodiment, the structural component with the circular cylindrical sealing surface has a diameter tolerance of +/−0.1 mm. With these tolerances of the frictional engagement connecting surface and the circular cylindrical sealing surface, an effective seating of the flow guiding element inside the structural component can be ensured.

During installation of the flow guiding element, the annular channel at least partially has a substantially constant radial height, a convergent part, and/or a divergent part.

In one embodiment, at least two gaps are present at the circumference following forming between the deformed enveloping surface of the flow guiding element and the circular cylindrical sealing surface. A certain flow exchange may occur through these gaps. Here, the number and shape of the gaps depends on the shape of the frictional engagement connecting surface with the closed enveloping surface. If for example the closed enveloping surface has an elliptical cross section, two gaps are present between the deformed enveloping surface and the circular cylindrical sealing surface, for example following deformation along the major axis of the ellipse, because of reasons of symmetry. In this case, the greatest radial width of the two gaps can be less than 0.5 mm, in particular less than 0.3 mm, especially particularly less than 0.2 mm.

In one embodiment, the flow guiding element is made of a nickel alloy, in particular of Inconel 718, for high temperature requirements.

Embodiments of the flow device can be used in an aircraft engine. At that, they can be in particular used in such a manner that the flow guiding appliance with the flow guiding element extends axially from an outlet guide vane of a high-pressure compressor up to a central area of a combustion chamber.

The objective is also achieved through a method according to the present disclosure, wherein
  a) a forming tool with a non-circular cross section is used for giving a circular cylindrical molded body for the flow guiding element an at least partially non-circular cross section as a closed enveloping surface,
  b) the flow guiding element has a frictional engagement connecting surface at the circumference for connecting the flow guiding element (30) to another structural component of the turbomachine, wherein the frictional engagement connecting surface with the closed enveloping surface is inserted in a deformed state with at least two opposite points into the structural component with a circular cylindrical sealing surface, so that, in the assembled state, the at least two points of the closed enveloping surface are arranged in at least two opposite frictionally engaged contact areas of the circular cylindrical sealing surface following deformation.

The invention is explained in more detail in connection with the exemplary embodiments shown in the Figures. Herein

Figure 1:
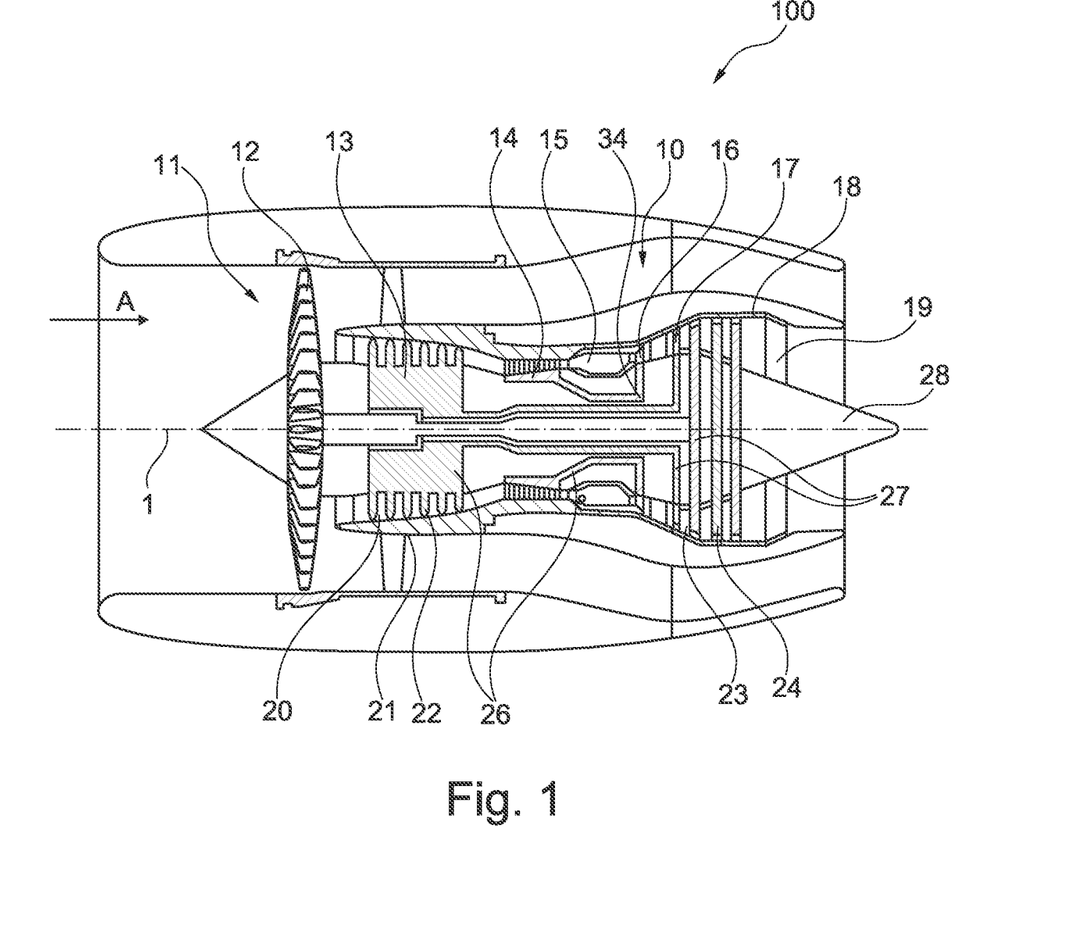
FIG. 1 shows a schematic rendering of an aircraft engine.

FIG. 1 shows a per se known aircraft engine 10 as an example of a turbomachine. Other turbomachines are stationary gas turbines or ship engines, for example.

In the shown form, the engine 100 is configured as a 3-shaft engine and comprises, arranged behind each other in the flow direction, an air intake 11, a fan 12 rotating inside a housing, a medium-pressure compressor 13, a high-pressure compressor 14, a combustion chamber 15, a high-pressure turbine 16, a medium-pressure turbine 17 and a low-pressure turbine 18, as well as an exhaust nozzle 19, which are all arranged around a central engine axis 1.

The medium-pressure compressor 13 and the high-pressure compressor 14 respectively comprise multiple stages that respectively have arrangements of stationary compressor guide vanes 20 that extend in the circumferential direction and that are generally referred to as stator blades and project radially inwards from the engine housing 21 into a ring-shaped flow channel of the compressors 13, 14.

Further, the compressors 13, 14 have an arrangement of compressor rotor blades 22 that project radially outward from a rotatable drum or disc 26, and are coupled to hubs 27 of the high-pressure turbine 16 or the medium-pressure turbine 17.

The turbines 16, 17, 18 have similar stages, comprising an arrangement of stationary turbine guide vanes 23 projecting radially inward from the core engine 21 into the ring-shaped flow channel of the turbines 16, 17, 18, and a subsequent arrangement of turbine blades/vanes 24 that project outwards from a rotatable hub 27.

During operation, the compressor drum or compressor disc 26 and the compressor rotor blades 22 arranged thereon as well as the turbine rotor hub 27 and the turbine rotor blades 24 arranged thereon rotate about the engine axis 1.

What is described in the following are embodiments of a flow guiding appliance with a flow guiding element 30 (also referred to as a windage shield) that is meant to guide a partial flow 31 which is located behind the outlet guide vanes 28 of the high-pressure compressor 14.

Figure 2:
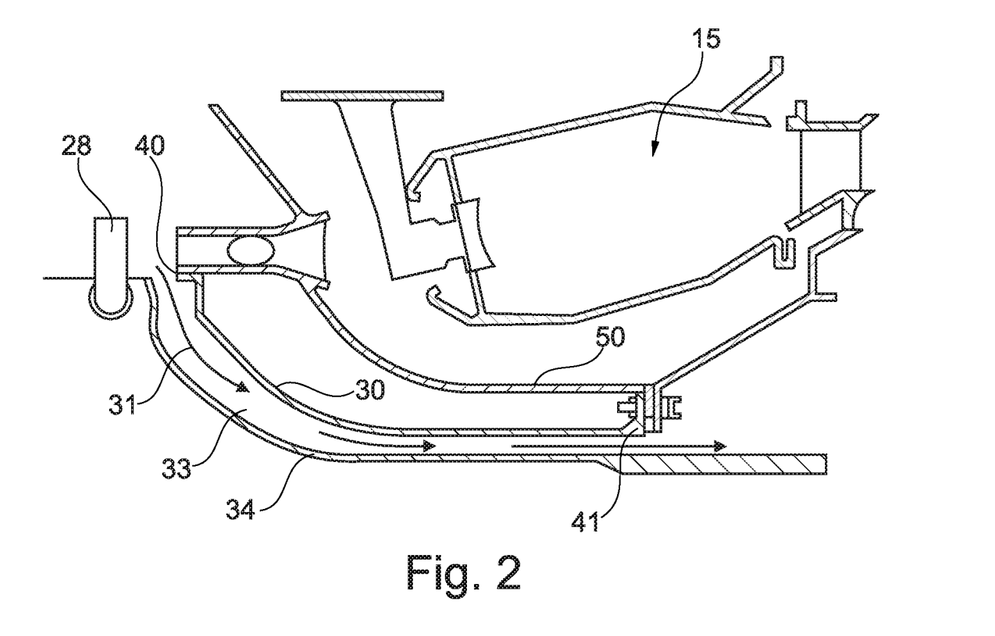
FIG. 2 shows a schematic sectional view through an embodiment of a flow guiding appliance with a flow guiding element.

This is shown in FIG. 2. Behind the outlet guide vane 28 (OGV), the partial flow 31, which is used for cooling purposes, among other things, is branched off. The partial flow 31 is guided through an annular channel 33 that is delimited radially inside by a high-pressure shaft 34, and is delimited radially outside by the flow guiding element 30. Towards the outlet, the annular channel 33 has an approximately constant height. At the beginning, the annular channel 33 is embodied in a slightly convergent manner. In other embodiments, the annular channel 33 can also have a different height profile. The targeted guiding of the partial flow 31 inside the annular channel 33 is meant to prevent swirling.

At two locations, the flow guiding element 30 is connected to a structural component 50 of the turbomachine 100, here the combustion chamber housing.

A fixed bearing 41 for the flow guiding element 30 is arranged downstream of the annular channel 33.

Upstream, in the area of the entry of the partial flow 31 into the annular channel 33, a frictionally engaged connection with a frictional engagement connecting surface 40 is provided at the flow guiding element 30.

As will be described in the following, the flow guiding element 30 is configured in a special manner, so that the frictional connection can be established in the flow guiding appliance in an efficient manner.

Figure 3:
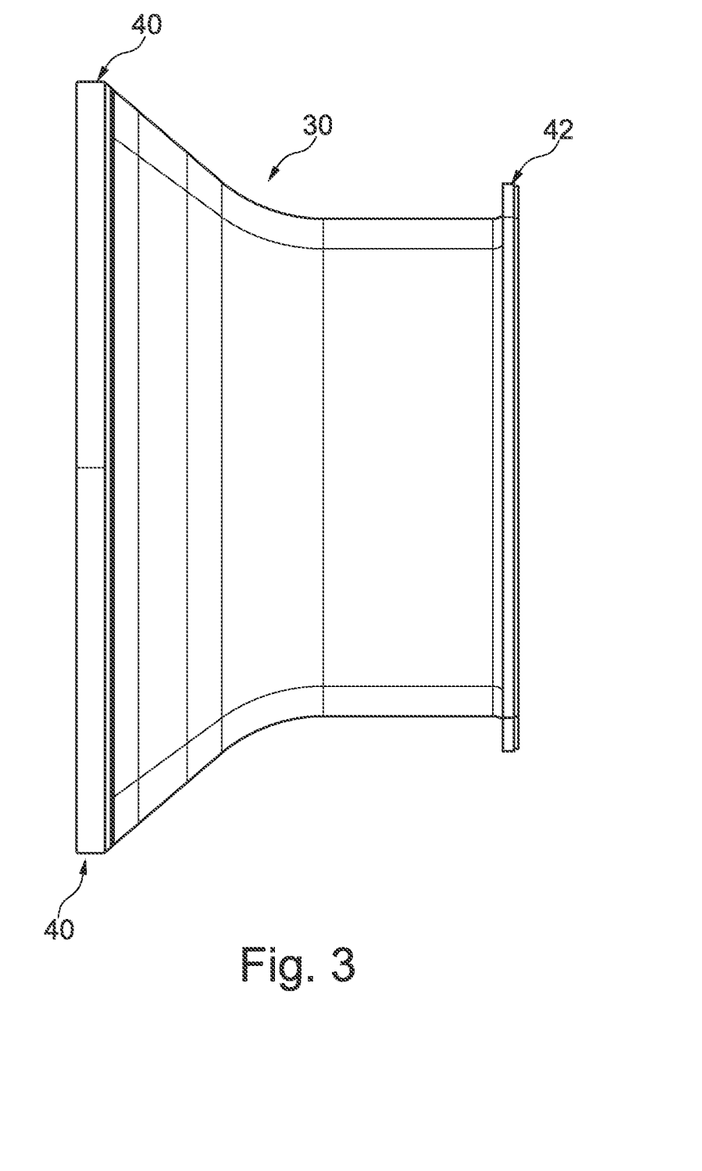
FIG. 3 shows a side view of an embodiment of a flow guiding element.

FIG. 3 shows this frictional engagement connecting surface 40 in a side view of the flow guiding element 30 at the upstream-side end. A flange 42 that can be connected to the fixed bearing (see FIG. 2) is arranged at the opposite end of the flow guiding element 30.

Figure 4A:
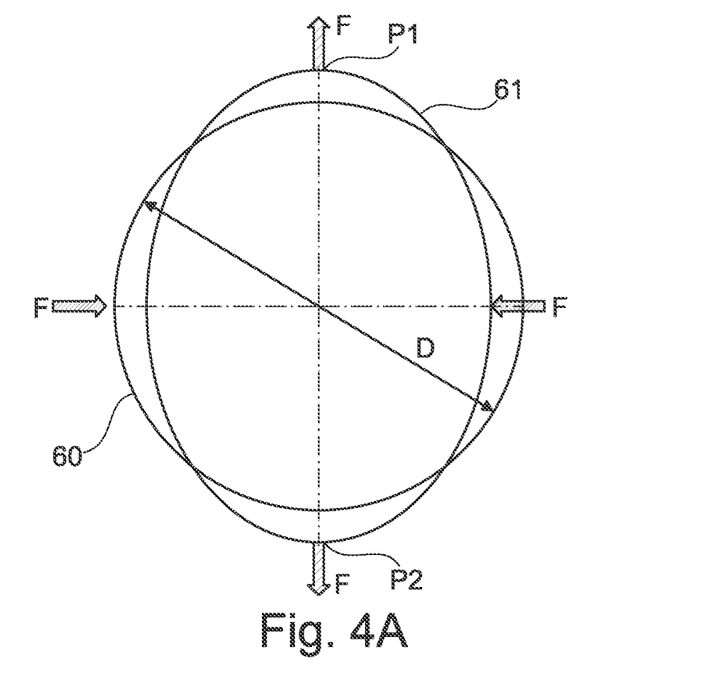
FIG. 4A shows a schematic rendering of the cross section of an embodiment of a flow guiding element prior to assembly with a structural component of a turbomachine.
Figure 4B:
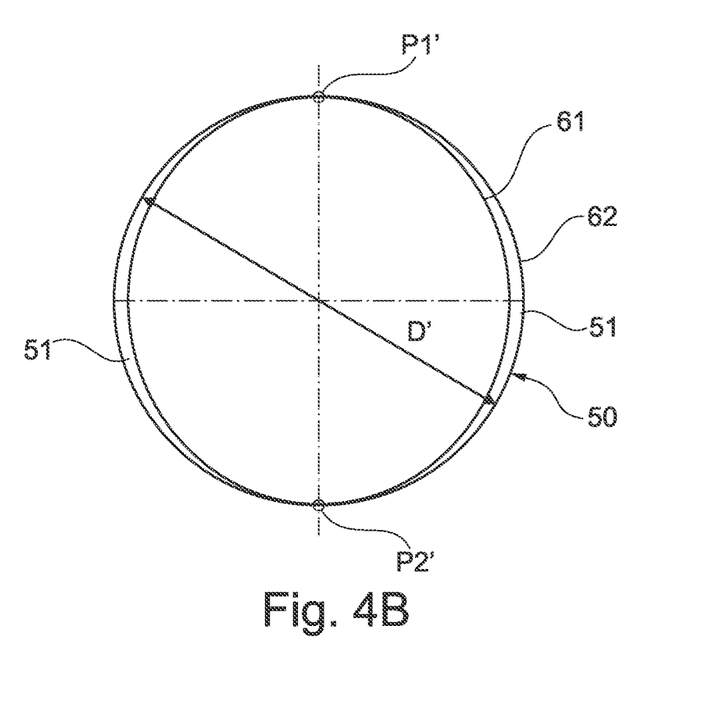
FIG. 4B shows a schematic rendering of the cross section of an embodiment of a flow guiding element and the deformation following installation into the structural component.

As is shown schematically in FIG. 4A, 4B, initially the cross-sectional surface of the flow guiding element 30 is not perfectly circular in the area of the frictional engagement connecting surface 40.

The starting point for creating the frictional connection is the flow guiding element 30 with a circular cylindrical cross-sectional surface in the area of the frictional engagement connecting surface 40. This means that initially the cross-sectional surface 60 (see FIG. 4A) of the flow guiding element 30 is circular in this area, with a diameter D.

A forming tool 71 (see FIG. 5) with a non-circular cross section can for example be used for giving an at least partially non-circular cross section to a circular cylindrical molded body for the flow guiding element 30 as a closed enveloping surface.

For connecting the flow guiding element 30 to the other structural component 50 of the turbomachine 100, the flow guiding element 30 has a frictional engagement connecting surface 40 at the circumference, wherein the frictional engagement connecting surface 40 with the closed enveloping surface 61 is inserted in a deformed state into the structural component 50 with a circular cylindrical sealing surface 62 with at least two opposite points P1, P2, so that, in the assembled state, the at least two points P1, P2 of the closed enveloping surface 61 are arranged inside at least two opposite frictionally engaged contact areas P1', P2' of the circular cylindrical sealing surface 62 following deformation. This is shown in FIG. 4A, 4B, for example.

By means of this method, the circumference of the flow guiding element 30 is deformed into an ellipse 61 in the area of the frictional engagement connecting surface 40, which is shown in FIG. 4A. The elliptical cross section forms a closed enveloping surface 61 with two opposite points P1, P2 at the ends of the major axis of the ellipse.

The eccentricity of the elliptical cross section of the closed enveloping surface 61 is shown in FIG. 4A in a strongly distorted manner in order to make the principle clear. In the embodiment shown here, the eccentricity is 0.9947, i.e. the deviation from the circular shape is small. Typically, the eccentricity can be between 0.95 and 0.999, in particular between 0.99 and 0.996.

Here, the major axis of the closed enveloping surface 61 with the elliptical cross section is dimensioned in such a manner that the ellipse can be connected to the structural component 50 by deforming the flow guiding element 30. Through the deformation, the two points P1, P2 of the ellipse are displaced into two opposite frictionally engaged contact areas P1', P2'.

The diameter D' of the structural component 50 thus substantially corresponds to the major axis of the ellipse 61.

Due to the elliptical shape, a gap 51 to the circular cylindrical sealing surface 62 is then formed at the sides, i.e. in the area of the minor axis of the ellipse 61 respectively laterally (i.e. in the area of the end points of the minor axis of the ellipse). At the position of the largest radial opening, the gap 51 can typically be less than 0.5 mm on both sides. The gaps 51 allow for a certain ventilation, which is desired.

By using a flow guiding element 30 with an elliptical basic cross section, it is achieved that it is obstructed by the structural component 50 during operation (degree of freedom at the small semi-axis of the ellipse).

If the flow guiding element 30 was to be fitted into the structural component in a circular cylindrical manner, a higher contact force at the frictional connecting surface 40 would be created during operation as a result of the stronger expansion of the flow guiding element 30. This would lead to the bulging of the flow guiding element 30. To avoid that, the frictional connecting surface 40 at the flow guiding element 30 is realized in an elliptical (or also polygonal etc.) manner, so that the flow guiding element 30 is provided with a degree of freedom for an unobstructed expansion with respect to the structural component 50.

The two open gaps 51 on the side of the small semi-axis of the ellipse are not supposed to close during operation, as otherwise the cavity between the flow guiding element 30 and the structural component 50 (as can be seen in FIG. 2) cannot be emptied in the case of the compressor pump, and thus the flow guiding element 30 would bulge due to the high pressure difference.

Figure 5:
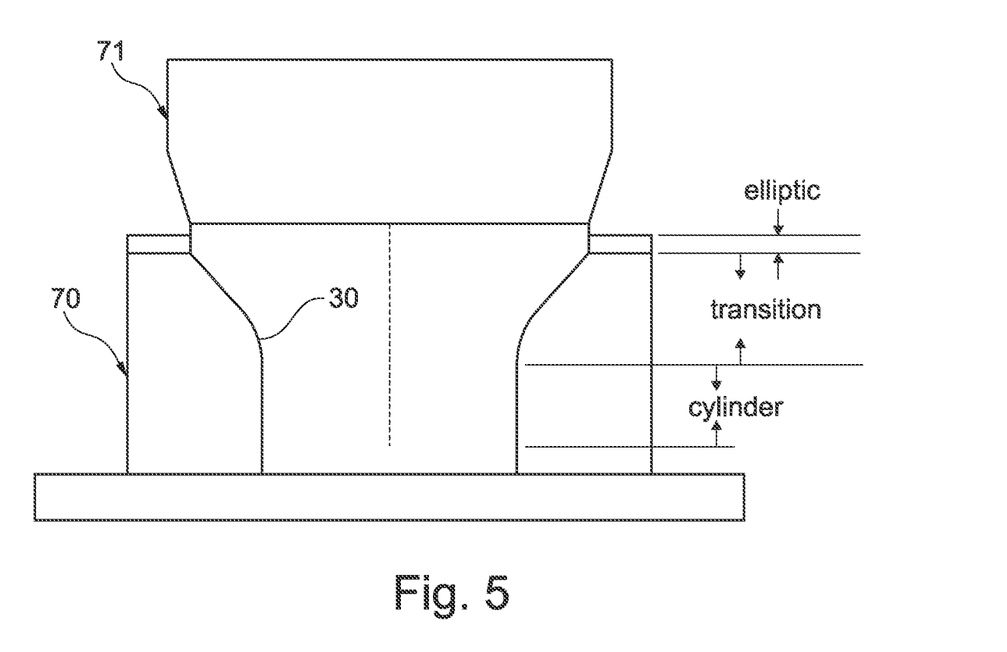
FIG. 5 shows a side view of a device for forming an elliptical cross section in an embodiment of a flow guiding element.

FIG. 5 shows a device by means of which a flow guiding element 30 of the kind as it is described herein can be created.

At that, the part of the flow guiding element 30 with a circular cylindrical cross section is arranged at the bottom inside a tool die 70. A forming tool having an elliptical cross section with the desired eccentricity is inserted into the upper end. Thus, an elliptical cross section is obtained in the upper part of the flow guiding element 30 as a result of the pressure directed into the flow guiding element 30, which continuously transitions into a circular cross section. This is shown in FIG. 5 based on the transition areas on the right.

PARTS LIST 1 engine axis
11 air intake
12 fan
13 medium-pressure compressor
14 high-pressure compressor
15 combustion chamber
16 high-pressure turbine
17 medium-pressure turbine
18 low-pressure turbine
19 exhaust nozzle
20 compressor guide vanes
21 core engine
22 compressor rotor blades
23 turbine guide vanes
24 turbine rotor blades
26 compressor drum or compressor disc
27 turbine rotor hub
28 outlet guide vanes of the high-pressure compressor
30 flow guiding element
31 partial flow
33 annular channel
34 high-pressure shaft
40 frictional engagement connecting surface
41 fixed bearing
42 flange
50 structural component
51 gap between the deformed flow guiding element and the structural component
60 basic cross section for the flow guiding element
61 closed enveloping surface, for example ellipse, polygon
62 circular cylindrical sealing surface
70 tool die
71 forming tool
100 turbomachine/aircraft engine
D, D' diameter
F force
P1, P2 points (prior to deformation)
P1', P2' contact areas (after deformation)

The invention claimed is:

1. A flow guiding appliance of a turbomachine for a partial flow of an exit flow of an outlet guide wheel of a compressor of the turbomachine, comprising:
a flow guiding element delimiting an annular channel about a shaft of the turbomachine,
a frictional engagement connecting surface at the circumference of the flow guiding element for connecting the flow guiding element to a separate structural component of the turbomachine, where the structural component includes a circular cylindrical sealing surface,
wherein the frictional engagement connecting surface includes a closed enveloping surface including an elliptical cross section with two contact points positioned respectively at opposite ends of a major axis of the closed enveloping surface, the closed enveloping surface being deformable to be positioned within the circular cylindrical sealing surface such that in an assembled state, the two contact Diets frictionally engage two opposite contact areas of the circular cylindrical sealing surface.

2. The flow guiding appliance according to claim 1, wherein the elliptical cross section has an eccentricity of between 0.95 and 0.999.

3. The flow guiding appliance according to claim 1, wherein the frictional engagement connecting surface has a diameter tolerance of +/−0.3 mm.

4. The flow guiding appliance according to claim 1, wherein the circular cylindrical sealing surface has a diameter tolerance of +/−0.1 mm.

5. The flow guiding appliance according to claim 1, wherein the annular channel at least partially has at least one chosen from a constant radial height, a convergent part, and a divergent part.

6. The flow guiding appliance according to claim 1, wherein, in the assembled state, there are two gaps between the closed enveloping surface and the circular cylindrical sealing surface.

7. The flow guiding appliance according to claim 6, wherein a greatest radial width of the two gaps is less than 0.5 mm.

8. The flow guiding appliance according to claim 6, wherein a greatest radial width of the two gaps is less than 0.3 mm.

9. The flow guiding appliance according to claim 6, wherein a greatest radial width of the two gaps is less than 0.2 mm.

10. The flow guiding appliance according to claim 1, wherein the flow guiding element is made of a nickel alloy.

11. A turbomachine, comprising the flow guiding appliance and the structural component according to claim 1.

12. The turbomachine according to claim 11, wherein the turbomachine includes a high pressure compressor, an outlet guide vane of the high-pressure compressor and a combustion chamber, and the flow guiding appliance extends axially from the outlet guide vane up to a central area of the combustion chamber.

13. The flow guiding appliance according to claim 1, wherein the elliptical cross section has an eccentricity of between 0.99 and 0.996.

14. A method for attaching a flow guiding appliance to a turbomachine, comprising:
providing:
a turbomachine, comprising:
a compressor including an outlet guide wheel;
a structural component including a circular cylindrical sealing surface,
a flow guide applicaince for a partial flow of an exit flow of the outlet guide wheel, the flow guiding appliance comprising:
a flow guiding element for delimiting an annular channel about a shaft of the turbomachine,
a frictional engagement connecting surface at a circumference of the flow guiding element for positioning within the circular cylindrical sealing surface,
wherein the flow guiding appliance initially includes a circular cylindrical molded body at the frictional engagement connecting surface,
using a forming tool with a non-circular cross section to give the frictional engagement connecting surface an elliptical cross section with two contact points positioned respectively at opposite ends of a major axis of the frictional engagement connecting surface,
deforming the frictional engagement connecting surface to fit within the cylindrical sealing surface,
inserting the flow guiding element in the deformed state into the circular cylindrical sealing surface such that the two contact points frictionally engage two opposite contact areas of the circular cylindrical sealing surface.

15. A turbomachine, comprising:
a compressor including an outlet guide wheel;
a structural component including a circular cylindrical sealing surface,
a flow guiding appliance for a partial flow of an exit flow of the outlet guide wheel, the flow guiding appliance comprising:
a flow guiding element delimiting an annular channel about a shaft of the turbomachine,
a frictional engagement connecting surface at a circumference of the flow guiding element positioned within the circular cylindrical sealing surface,
wherein the frictional engagement connecting surface includes a closed enveloping surface that is non-circular to form two opposite contact points frictionally engaging two opposite contact areas of the circular cylindrical sealing surface, and two gaps between the closed enveloping surface and the circular cylindrical sealing surface, the two gaps respectively positioned circumferentially between the two opposite contact areas.

16. The turbomachine according to claim 15, wherein:
the turbomachine further comprises a combustion chamber;
the compressor is a high pressure compressor, and
the flow guiding appliance extends axially from the outlet guide vane up to a central area of the combustion chamber.

* * * * *